United States Patent Office 3,169,137
Patented Feb. 9, 1965

3,169,137
NOVEL 17α-AMINOALKYL AND AMINOALKYNYL
1,3,5(10)-ESTRATRIEN-17-OL-3-ETHERS
Gerhard R. Wendt, Havertown, and Kurt W. Ledig, Philadelphia, Pa., assignors to American Home Products Corporation, New York, N.Y., a corporation of Delaware
No Drawing. Filed May 7, 1963, Ser. No. 278,759
9 Claims. (Cl. 260—397.5)

This invention relates in general to novel steroid compounds and methods for their preparation and use in pharmacy. More particularly the invention involves certain novel 17-aminoalkyl and 17-aminoalkynyl substituted 1,3,5(10)-estratrien-3-ethers which may be generally represented by one of the general formulae:

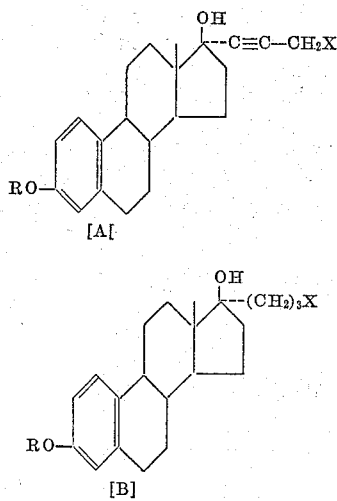

wherein R is selected from the group consisting of lower alkyl groups of up to about 7 carbon atoms the preferred of which are methyl or ethyl; lower cycloalkyl groups which may include cyclohexyl, cyclopentyl and the like; X represents an amino group such as a dialkylamino group like dimethylamino or diethylamino, preferably; or ring unsubstituted cyclic amino groups such as morpholino, piperidino, pyrrolidino, hexamethyleneimino as well as ring alkyl substituted cyclic amino groups as for example N-alkyl piperazino, 2-methyl morpholino, 2,2-dimethylpyrrolidino, which would be equivalent to their unsubstituted analogs.

The compounds of the invention are useful cholesterol lowering agents as well as being valuable as intermediates for further steriod synthesis by reducing the aromatic ring A. Their use extends as well to the field of experimental pharmacology where they may serve in a comparative role in the evaluation of other cholesterol lowering agents. In the field of veterinary medicine they find use in treatment of animals who experience hormonal difficulties such as regulating estrous. In the main the compounds of the invention demonstrate good antilipemic properties coupled with low estrogenic activity. Moreover in addition to their capacity to regulate blood lipids the compounds are useful for their general hormonal effect particularly in the female and this would be expected to exhibit utility in those areas where natural estrogens are normally employed such as female hypogonadism, amenorrhea, dysmenorrhea, metorrhagia, pregnancy control, ovulation block and contraception, arteriosclerosis, osteoporosis, menopausal symptoms, infertility, regulation of water balance, and functional uterine bleeding.

The novel compounds illustrated above can be formulated and administered to mammals for any of the uses noted in a wide variety of oral or parenteral dosage forms singly or in admixture with other active compounds. When contemplated for use in pharmaceutical products they may be admixed and administered in combination with a large number of compatible diluents, carriers and the like to form a pharmaceutical composition. Such well-known liquid carriers as water, mineral or vegetable oil or a lower non-toxic aliphatic alcohol may be used where injectables are to be prepared. Glycerine or a similar substance may be used where the compound is to be administered as a syrup. Solid excipients, binders, extenders and carriers such as carboxymethylcellulose, starches, sugars and the like may be added where tablets or powders are to be employed as a means of administration. The dosage of the compounds will vary with the severity of the ailment and in general can vary from about 0.5 to 100 mg./kilo of body weight per day depending upon the many factors of the case involved.

The novel compounds of the invention can for the most part be prepared according to the following reaction scheme:

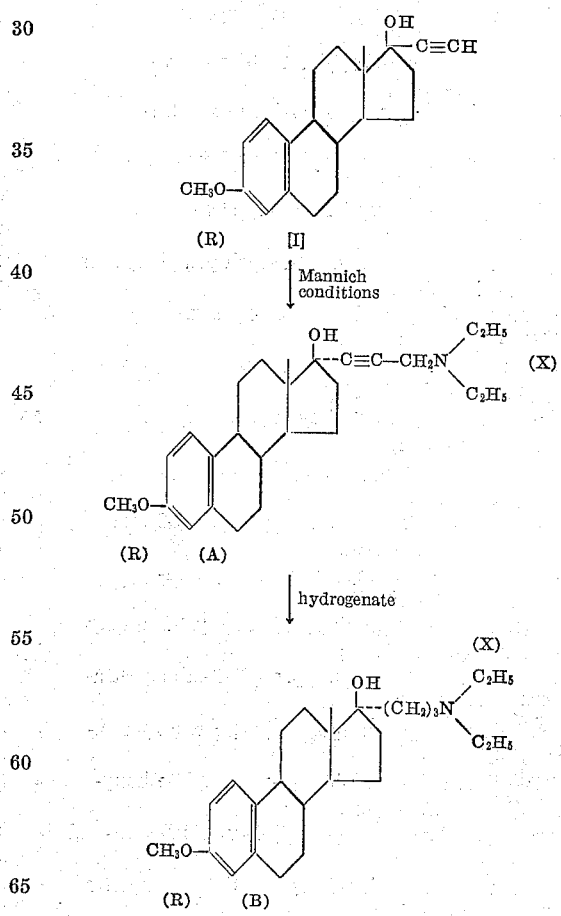

In the above reaction although R and X are specifically illustrated it is to be understood that they have in practice the general meanings given in the generic description of the compounds of the invention as set forth above. The reaction proceeds by treatment of a typical known starting material such as 17α-ethynyl-3-methoxyestra-1,3,5(10)-trien-17-ol [I] normally under typical Mannich conditions such as reaction of the starting material with formaldehyde and a secondary amine such as diethylamine as in this illustration to obtain the Mannich base 17α-(3-diethylamino-1-propynyl) - 3 - methoxyestra - 1,3,5(10)-trien-17-ol [A]. The final products of the [B] type are obtained as illustrated by the preparation of 17α-(3-diethylaminopropyl) - 3-methoxyestra-1,3,5(10)-trien-17-ol, by reduction of [A] with suitable reducing agents such as for example hydrogen in the presence of a suitable active catalyst like palladium or charcoal until hydrogen uptake ceases.

We have illustrated a preferred Mannich type reaction for preparation of [A] in the above reaction but it is of course to be understood that several other Mannich type reaction conditions generally recognized in the art may equally be employed such as will result in the condensation of a compound containing an active hydrogen atom with formaldehyde and ammonia or a primary or secondary amine which results in the replacement of the hydrogen by a aminomethyl group. The formaldehyde is generally used in aqueous solution and the amine in the form of its salt such as its acetate for instance. Yields are variable depending on the nature of the reactants.

Some specific compounds falling within the broad scope of the invention may be noted. To cite a few one may note d-17α1(3-diethylamino-1-propynyl)-3-methoxyestra-1,3,5(10)-trien-17-ol;
d-17α-(3-dimethylamino-1-propynyl)-3-methoxyestra-1,3,5(10)-trien-17-ol;
d-17α-(3-diethylaminopropyl)-3-methoxyestra-1,3,5,(10)-trien-17-ol;
d-17α-(3-dimethylaminopropyl)3-methoxyestra-1,3,5(10)-trien-17-ol;
d-17α-(3-morpholino-1-propynyl)-3-butoxyestra-1,3,5(10)-trien-17-ol;
d-17α-(3-morpholino-1-propynyl)-3-methoxyestra-1,3,5(10)-trien-17-ol;
d-17α-(3-morpholinopropyl)-3-butoxyestra-1,3,5,(10)-trien-17-ol;
d-17α-(3-pyrrolidino-1-propynyl)-3-cyclopentyloxyestra-1,3,5(10)-trien-17-ol;
d-17α-(3-morpholinopropyl)-3-methoxyestra-1,3,5(10)-trien-17-ol;
d-17α-(3-diethylamino-1-propynyl)-3-cyclopentyloxy-estra-1,3,5(10)-trien-17-ol;
d-17α-(3-pyrrolidinopropyl)-3-cyclopentyloxyestra,1,3,5(10)-trien-17-ol;
d-17α(3-diethylaminopropyl)-3-cyclopentyloxyestra-1,3,5(10)-trien-17-ol.
Also d - 17α(3 - dipropylamino-1-propynyl)-3-methoxyestra-1,3,5(10)-trien-17-ol;
d-17α-(3-dipropylaminopropyl)3-methoxyestra-1,3,5(10)-trien-17-ol;
d-17α-[3-(2'-methylmorpholino)-1-propynyl]-3-ethoxy-estra-1,3,5(10)-trien-17-ol;
d-17α-[3-(2'-methylmorpholino)propyl]-3-ethoxyestra-1,3,5(10)-trien-17-ol;
17α[3-(2,2-dimethylpyrrolidino)propyl]-3-ethoxyestra-1,3,5(10)-trien-17-ol;
17α-[3-(2,2-dimethylpyrrolidino)-1-propynyl]-ethoxy-estra-1,3,5(10)-trien-17-ol;
17α-(3-hexamethylene-iminopropyl)-3-methoxyestra-1,3,5(10)-trien-17-ol;
17α-(3-hexamethylene-imino-1-propynyl)-3-ethoxyestra-1,3,5(10)-trien-17-ol;
17α-(3-N-methyl-piperazino-1-propynyl)-3-allyloxy-estra-1,3,5(10)-trien-17-ol;
17α-(3-piperidino-1-propynyl)-3-benzyloxyestra-1,3,5(10)-trien-17-ol and the like which would be expected to exhibit characteristics equivalent to the compounds typified by the several examples set forth hereinbelow.

It is of course to be understood that the several examples of the preparation of selected members of the series are given purely by way of illustration and are not intended to limit the scope of the invention in any manner. For a legal definition of the scope of the invention disclosed herein attention may be directed only to the several claims appended hereto.

EXAMPLE 1

*d-17α-(3-diethylamino-1-propynyl)-3-methoxyestra-1,3,5(10)-trien-17-ol*

Heat a suspension of 9.0 g. of 17α-ethynyl-3-methoxyestra-1,3,5(10)-trien-17-ol, 75 ml. of dioxane, 5 ml. of water, 2.4 ml. of formaldehyde (40% aqueous solution), 2.5 ml. of diethylamine, 5 ml. of acetic acid, and 200 mg. of cuprous chloride for 22 hours at 60° under nitrogen. Pour the reaction mixture into ice-water, make alkaline with 10% sodium hydroxide, extract with ether, wash the organic layer with water and brine, and dry over magnesium sulfate. After evaporating the ether, dissolve the resulting residue in aqueous acetic acid and separate the neutral compound with ether. Make the aqueous layer alkaline and extract the product with ether. Evaporate the ether and recrystallize the resulting crude product from methanol/water to obtain 6.8 g. (59.5%) of the product of this example: M.P. 94–95°. I.R. 3μ; U.V. 278 mμ(ε2,150).

*Analysis.*—Calcd. for $C_{26}H_{37}NO_2$: C, 78.94; H, 9.43; N, 3.54%. Found: C, 79.24; H, 9.42; N, 3.45%.

EXAMPLE 2

*d-17α-(3-morpholino-1-propynyl)-3-butoxyestra-1,3,5(10)-trien-17-ol*

Using a molar equivalent of morpholine in place of diethylamine, and a molar equivalent of 17α-ethynyl-3-butoxyestra-1,3,5(10)-trien-17-ol in place of 17α-ethynyl-3-methoxyestra-1,3,5(10)-trien-17-ol, as in Example 1, the product of this example may be obtained.

EXAMPLE 3

*d-17α(3-pyrrolidino-1-propynyl)-3-cyclopentyloxyestra-1,3,5(10)-trien-17-ol*

Using a molar equivalent of pyrrolidine in place of diethylamine and a molar equivalent of 17α-ethynyl-3-cyclopentyloxyestra-1,3,5(10)-trien-17-ol in place of 17α-ethynyl-3-methoxyestra-1,3,5(10)-trien-17-ol, as in Example 1, the product of this example may be obtained.

EXAMPLE 4

*d-17 -(3-morpholino-1-propynyl)-3butoxyestra-1,3,5(10)-trien-17-ol*

Hydrogenate a mixture of 5.0 g. of *d*-17α-(3-diethylamino-1-propynyl)-3-methoxestra-1,3,5(10)-trien-17 - ol, 250 ml. of methanol, and 10 drops of conc. hydrochloric acid at 1 atmosphere in the presence of 1.5 g. of 10% palladium on charcoal until the hydrogen uptake ceases. Filter off the catalyst and evaporate the solution. Dissolve the resulting residue in ether and wash with 10% sodium carbonate solution, and with brine, and finally dry over magnesium sulfate. Evaporate the ether to obtain the product of this example as a gum. I.R. 3 mμ.

EXAMPLE 5

*d-17α-(3-morpholinopropyl)-3-butoxyestra-1,3,5(10)-trien-17-ol*

Substituting *d* - 17α - (3-diethylamino-1-propynyl)-3-methoxyestra-1,3,5(10)-trien-17-ol by *d*-17α-(3-morpholino-1-propynyl)-3-butoxyestra-1,3,5(10)-trien-17-ol, and proceeding as described in Example 4, the product of this example may be obtained.

EXAMPLE 6

*d-17α-(3-pyrrolidinopropyl)-3-cyclopentyloxyestra-1,3,5(10)-trien-17-ol*

Substituting *d* - 17α - (3 - diethylamino - 1 - propynyl)-3-methoxyestra-1,3,5(10)-trien-17-ol by *d*-17α-(3-pyrrolidino - 1 - propynyl) - 3 - cyclopentyloxyestra - 1,3,5(10)-trien-17-ol and proceeding as described in Example 4, the product of this example may be obtained.

EXAMPLE 7

*d-17α-(3-piperidino-1-propynyl)-3-propoxyestra-1,3,5(10)-trien-17-ol*

Using a molar equivalent of piperidine in place of diethylamine, and a molar equivalent of 17α-ethynyl-3-propoxyestra-1,3,5(10)-trien-17-ol in place of 17α-ethynyl-3-methoxyestra-1,3,5(10)-trien-ol, as in Example 1, the product of this example may be obtained.

EXAMPLE 8

*d-17α-(3-piperidinopropyl)-3-propoxyestra-1-3-5(10)-trien-17-ol*

Substituting *d* - 17α - (3 - diethylamino - 1 - propynyl)-3-methoxyestra-1,3,5(10)-trien-17-ol by *d*-17α-(3-piperidino - 1 - propynyl) - 3 - propoxyestra 1,3,5(10) - trien-17-ol, and proceeding as described in Example 4, the product of this example may be obtained.

EXAMPLE 9

*d-17α-(3-N-methylpiperazino-1-propynyl)-3-cyclohexyloxyestra-1,3,5(10)-trien-17-ol*

Using a molar equivalent of N-methylpiperazine in place of diethylamine, and a molar equivalent of 17α-ethynyl - 3 - cyclohexyloxyestra - 1,3,5(10) - trien - 17-ol in place of 17α-ethynyl-3-methoxyestra-1,3,5(10)-trien-17-ol, as in Example 1, the product of this example may be obtained.

EXAMPLE 10

*d-17α-(3-N-methylpiperazinopropyl)-3-cyclohexyloxyestra-1,3,5(10)-trien-17-ol*

Substituting *d* - 17α - (3 - diethylamino - 1 - propynyl)-3 - methoxyestra - 1,3,5(10) - trien - 17 - ol by *d* - 17α-(3 - N - methylpiperazino - 1 - propynyl) - 3 - cyclohexyloxyestra-1,3,5(10)-trien-17-ol, and proceeding as described in Example 4, the product of this example may be obtained.

We claim:

1. A compound selected from the group consisting of those having one of the structural formulae:

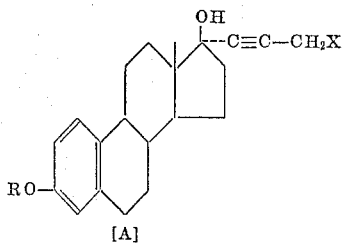

[A]

and

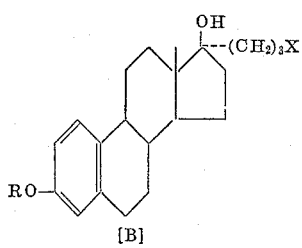

[B]

wherein R represents a substituent selected from the group consisting of lower alkyl, and lower cycloalkyl of up to 7 carbon atoms, and X represents an amino substituent selected from the group consisting of diloweralkylamino, morpholino, piperidino, pyrrolidino, and N-alkylpiperazino.

2. A compound according to claim 1 having the A structure wherein the R is a lower alkyl group and X is a diloweralkylamino group.

3. A compound according to claim 2 wherein the lower alkyl group is methyl.

4. 17α - (3 - diethylamino - 1 - propynyl) - 3 - methoxy-estra-1,3,5(10)-trien-17-ol.

5. A compound according to claim 1 having the B structure wherein R is a lower alkyl group and X is a diloweralkylamino group.

6. A compound according to claim 5 wherein the lower alkyl group is methyl.

7. 17α - (3 - diethylaminopropyl) - 3 - methoxyestra-1,3,5(10)-trien-17-ol.

8. 17α - aminoalkyl - 3 - (lower)alkoxyestra - 1,3,5(10)-trien-17-ol.

9. 17α - aminoalkyl - 3 - (lower)alkoxyestra - 1,3,5(10)-trien-17-ol.

References Cited in the file of this patent

UNITED STATES PATENTS 3,033,873    Pinson et al. _____ May 8, 1962

OTHER REFERENCES

Rapalla et al.: J. Org. Chem. (1958), page 1404.

UNITED STATES PATENT OFFICE
CERTIFICATE OF CORRECTION

Patent No. 3,169,137                                          February 9, 1965

Gerhard R. Wendt et al.

It is hereby certified that error appears in the above numbered patent requiring correction and that the said Letters Patent should read as corrected below.

Column 3, line 17, for "or" read -- on --; line 55, for "-cyclopentyloxyestra," read -- -cyclopentyloxyestra- --; line 59, for "d-17α(3-" read -- d-17α-(3- --; lines 70 and 71, for "-1-propynyl]-ethoxyestra-" read -- -1-propynyl]-3-ethoxyestra- --; column 4, lines 61 and 62, for "d-17-(3-morpholino-1-propynyl)-3butoxyestra-1,3,5(10)", in italics, read -- d-17α-(3-diethylaminopropyl)-3-methoxyestra-1,3,5(10) --, in italics.

Signed and sealed this 3rd day of August 1965.

(SEAL)
Attest:

ERNEST W. SWIDER                                           EDWARD J. BRENNER
Attesting Officer                                             Commissioner of Patents